No. 611,271. Patented Sept. 27, 1898.
O. PREIL.
ELECTRIC RAILWAY.
(Application filed Dec. 30, 1897.)
(No Model.)
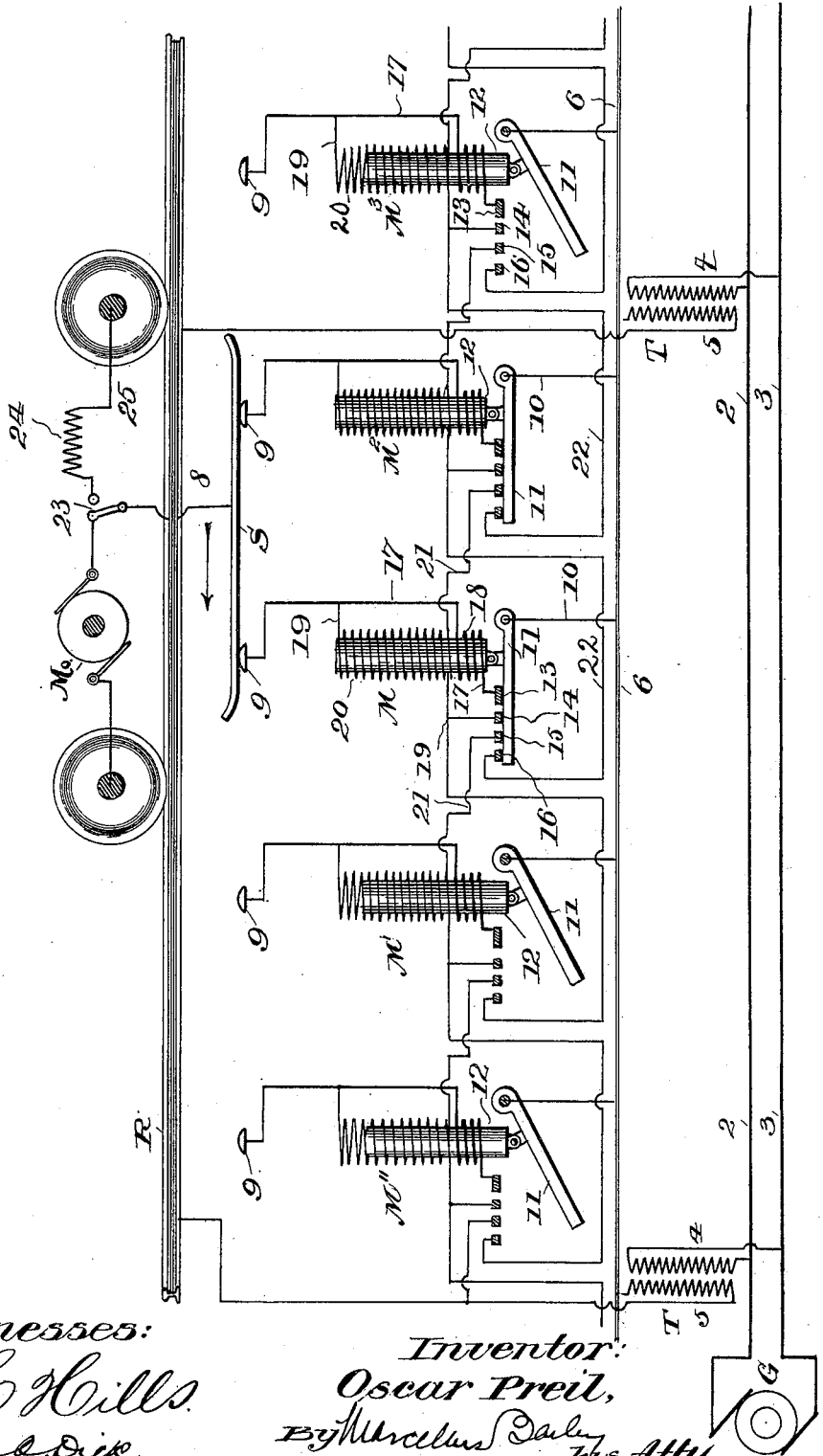
Witnesses:
L. C. Hills.
Ewell A. Dick.
Inventor:
Oscar Preil,
By Marcellus Bailey
his Atty.
THE NORRIS PETERS CO., PHOTO-LITHO., WASHINGTON, D. C.

UNITED STATES PATENT OFFICE.

OSCAR PREIL, OF WASHINGTON, DISTRICT OF COLUMBIA, ASSIGNOR TO THE WHELESS INDUCTION RAILWAY COMPANY, OF SAME PLACE.

ELECTRIC RAILWAY.

SPECIFICATION forming part of Letters Patent No. 611,271, dated September 27, 1898.

Application filed December 30, 1897. Serial No. 664,547. (No model.)

*To all whom it may concern:*

Be it known that I, OSCAR PREIL, a citizen of the United States, and a resident of Washington city, in the District of Columbia, have invented certain new and useful Improvements in Electric Railways, of which the following is a specification.

My invention relates to underground electric-railway equipments, particularly to that system in which the working current is taken from contact buttons, plates, or short sections, which by electromagnetic action are successively brought into electric connection with the feed-wire as the car bearing the motor travels over the line.

The invention consists in novel methods of arranging the circuits, contacts, and other electric parts of the system, whereby the system is improved, simplified, and made more certain and accurate in its working.

In the accompanying drawing, which is a diagrammatic illustration of the features of an electric-railway system essential to an understanding of my invention, I have shown it applied to a system equipped to use alterternating electric currents of high tension, which are by suitable devices transformed to currents of less tension, which the motors are arranged to receive and utilize.

In the drawing, 2 3 represent the main conductors or leads from the generator G, which in this instance is supposed to be an alternating-current dynamo adapted to generate a current of high voltage.

T T represent transformers situated at suitable distances apart along the line, the primary coils 4 of which are arranged in parallel between the mains 2 and 3 and the secondary coils 5 of which are arranged in parallel between the supply of feed-conductor 6, from which the current is taken directly to the sectional conductors or contacts and the return-conductor R, which in this instance is represented as being one of the rails on which the cars travel. These transformers reduce the current in a manner well known to a voltage suitable for the motors M o, arranged upon the cars.

S represents a contact-shoe carried by the car and connected with the motor-circuit by a conductor 8. The shoe is arranged to contact with buttons or plates 9, arranged at suitable distances apart and connected, through switching mechanisms, with the feed-wire 6. These switch mechanisms are arranged in boxes situated below the surface of the ground and are properly insulated; but as the protection and mounting of these parts of an electric-railway equipment are well understood and form no part of my invention they are not illustrated.

The switching devices are duplicates one of the other, and I will first describe the circuits and electric connections of one of them.

10 is a conductor leading from the feed-wire 6 to an armature-lever 11, which is shown as pivotally connected with the movable core 12 of a hollow electromagnet M. This armature-lever is adapted to make four contacts 13, 14, 15, and 16 when raised or attracted by its magnet. The contact 13 is connected by a wire 17 with one of the buttons or plates 9 and in its course is coiled a few times around the magnet M, thus constituting a low-resistance coil 18. This conductor 17 serves to take the current which operates the motors from the feed-wire 6 to the contact-buttons and is preferably formed of a wire of low resistance and constitutes the working-current circuit of the sectional contact-station. From the contact 14 a wire 19 connects with the working-current circuit 17 beyond the electromagnet—that is, on the side nearest the contact-button 9—and constitutes a shunt-circuit, in which is included a coil 20 around the magnet M of higher resistance than the coil 18. This circuit is not essential to my invention and might be omitted; but I prefer to retain it, because when the lever 11 is raised to make contacts 13 and 14 that portion of the current which takes the shunt-circuit 19 in passing through the coil 20 increases the potential of the electromagnet above that which it has from the current passing through the coil 18 of the working-current circuit, and this serves to insure the armature-lever making good contacts and being held securely in place. The contact 15 is connected by a wire 21 with the coil 20 of the magnet M' of the station in advance of the one now being described, and the contact 16 is connected by a wire 22 with the coil 20 of the magnet M² at the station in the rear. It will be seen that by means of the construction just described the contact-buttons 9, both in front and rear of the one or ones engaged by the shoe S, are connected through shunt-circuits and the coils 20 with the feed-wire 6 and that as soon as either of these circuits is completed by the engagement of the shoe with the button or plate 9 connected therewith the magnet in such circuit will be energized and the armature thereof attracted, making the contacts 13 14 15 16 and switching on the working current through circuit 17 at the station just operated.

By connecting the buttons or contact-plates on either side of the station through which the current is being taken to the motor with the feed-wire the car may be made to run in either direction upon the track, and such connections would be employed on a single-track road; but where the road is double-tracked and the cars on one track are supposed to run always in one direction the rearward connections 16 and 22 might be omitted; but I now contemplate retaining these connections under all circumstances, so as to make it possible to run the cars in either direction at pleasure.

At 25 there is indicated a circuit upon the car connected at one extremity with the conductor 8, which supplies current from the shoe S, and at its other extremity with the return-rail R through the framework of the car or in other suitable manner. Suitable resistance may be introduced into the circuit, as represented at 24. By means of a switch 23 either the motor or this circuit 25 may be cut into or out of the circuit supplied through the wire or conductor 8; but this switch should be so arranged as that there is never a complete break of the circuit when a change in circuit is being made by the operation of the switch. The function of this circuit 25 is to insure a sufficient flow of current through the station with which the shoe may be in connection whenever the current is turned off from the motor and whether the car be in motion or standing still in order to keep the armature-levers raised or attracted, so that current may be instantly supplied to the motor whenever required.

The operation of the system which has been described may now be understood. The drawing shows in diagram a portion of an electric-railway system equipped according to my invention, a motor-car and five "contact-stations," by which term I include the contact button or plate with which the shoe engages and the switching devices associated therewith, being illustrated. The magnets of the several contact-stations are designated, beginning at the right of the drawing, as M³ M² M M' M'', and the shoe of the car is represented as being in contact with the buttons which are connected directly with the magnets M² and M. Under these conditions the working current from the feed-wire 6 is taken at these two stations, and current is taken whether the car be in motion or standing still, in the former case the complete circuit being through the motor and in the latter through the circuit 25. The armature-levers 11 at these two stations are both elevated by reason of the attraction of their magnets M² and M, and by their position they close the contacts 13, 14, 15, and 16. The contact 13 of the magnet M² station completes a circuit through which the working current is supplied as follows: from feed-wire 6, by wire 10, to the armature-lever, contact 13, working circuit 17, including the coil 18, to the button or contact-plate 9, where the car-shoe takes the current and passes it to the motor and the return-rail in the usual or any approved manner. The current through the magnet-coil 18 energizes the magnet and holds the armature-lever in place. The contact 14 completes the shunt-circuit 19, which includes the high-resistance coil 20, the current diverted through this serving to augment the force of the electromagnet to secure the armature-lever being securely held in place. Like conditions to those just described exist at the station of the magnet M. The contact 15 of the magnet M² station connects, through the shunt-circuit 21, with the coil 20 of the magnet M of the station in advance, and the shoe being in contact with the button 9 of that station a complete shunt-circuit is formed and continues so long as the shoe contacts with the two buttons, as shown in the diagram. The contact 16 of the station M² puts the coil 20 of the magnet M³ of the station in rear in circuit with the feed-wire 6 through the wire or shunt circuit 22; but as this circuit is broken at the button 9 of this rear station no current passes, the magnet M³ is not energized, and the armature-lever thereof is retracted, breaking the several contacts of that station. It will be understood, however, that should the car move backward or in the direction opposite to that indicated by the arrow in the diagram as soon as the shoe comes into contact with the button of the station of magnet M³ a circuit will be completed through the coil 20 of such magnet as follows: contact 16 of magnet M², shunt-circuit 22, coil 20 of magnet M³, circuits 19 and 17, button 9, shoe and car connections, which will cause the magnet to be energized, the armature-lever to be attracted, and the several contacts at the magnet M³ station to be made, when the conditions will be the same as have been described with reference to magnet M² station. If the car moves in the direction of the arrow from the position indicated in the diagram to one in which the shoe is in contact only with the button of magnet M, the following result will take place: As the shoe leaves the button of magnet M² all current through such magnet will be cut off and the armature-lever will fall, breaking all the contacts at this station. The breaking of the contact 16 at this point will cut out of circuit the coil 20 of the magnet M³ in rear; but the coil 20 of the magnet M² will still be in circuit with the feed-wire by reason of the connection at contact 16 of the magnet M. The coil 20 of the magnet M' in advance of the station M is in circuit with the feed-wire by reason of the contact 15 and connecting-wire 21, as it was when the parts were in the position of the diagram. If now the car still further advances until the shoe contacts with the button of the magnet M', the circuit will first be completed through contact 16, wire 21, and coil 20, energizing magnet M' and causing the armature-lever to be lifted, when the positions of the parts at the stations of magnets M and M' will be the same as those shown in the diagram with reference to stations M² and M. It will thus be seen that the current is taken directly from the feed-wire only through working-current circuits of the switching-stations, with the buttons of which the car-shoe may be in contact, and that the magnets on either side of the stations in actual use are in circuit connection with the feed-wire through connections controlled at the station or stations actually in use; but these circuits are not complete until contact of the shoe with the buttons is actually made. It is of course to be understood that if the rearward shunt-circuit were omitted, as in a double-tracked road, then the magnets of the forward stations only would be connected with the feed-wire through contacts made at the station in actual working relations.

While I have illustrated and described my invention as applied to an alternating-current system, it should be remembered that it is in its essential features equally applicable to a system employing direct currents.

In place of buttons or contact-plates and a shoe sectional rails and a contact-brush carried by the car might be employed. Whichever arrangement be used the surface contacts should be so arranged that the car-body covers all such contacts as may at any time be made alive by the operation of the car for manifest reasons of safety.

Having described my invention, what I claim, and desire to secure by Letters Patent, is—

1. An electric-railway system comprising a feed-main, separate contact-stations, circuit connections for the working current between each contact-station and the feed-main, each including a single electromagnet, switching devices controlled by such magnets whereby the working circuit is made and broken, and circuit connections at each station, controlled by such switching devices, and each connected with the magnet in the working circuit of another station, substantially as and for the purposes hereinbefore set forth.

2. An electric-railway system comprising a feed-main, separate contact-stations, an electromagnet and switching devices controlled thereby for each station, circuit connections for the working current including the said electromagnets, and extending directly between the feed-main and the contacts, such circuits being made and broken by the said switching devices, and shunt-circuits controlled by the said switching devices, and each including the electromagnet of a station other than the one through which the working current is passing, substantially as and for the purposes hereinbefore set forth.

3. An electric-railway system comprising a feed-main, separate contact-stations, an electromagnet having a high and a low resistance coil, for each station, switching devices operated by the magnets for controlling the circuits, circuits for the working current including the low-resistance coils of the magnets, and circuits including the high-resistance coils of the magnets, such circuits being controlled by the switching devices at stations beyond the magnets with which they are connected, substantially as and for the purposes hereinbefore set forth.

4. An electric-railway system comprising a feed-main, separate contact-stations, an electromagnet at each station, switching devices operated by each magnet for controlling the circuits, a circuit for the working current at each station, and shunt-circuits at each station extending in either direction therefrom and including coils of the electromagnets at the stations both in advance and rear of the station where they are controlled, substantially as and for the purposes hereinbefore set forth.

5. An electric railway, comprising a feed-main, separate contact-stations, an electromagnet at each station, switching devices actuated by the electromagnets, contacts arranged to be made when the switching devices are actuated and thereby brought into circuit with the feed-main, working-current circuits each from one of the said contacts through a coil of the electromagnet which controls the making and breaking of its circuit, to the contact for the collector carried by the cars, shunt-circuits each extending from one of the said contacts through a coil of the electromagnet at the station in advance, and other shunt-circuits, each extending from one of said contacts through the coil of the electromagnet at the station in rear, all the said shunt-circuits connecting with the contacts for the car-collector, substantially as and for the purposes hereinbefore set forth.

6. An electric railway comprising a feed-main, separate surface contact-stations, and the following described apparatus at each station: viz: an electromagnet having two coils 18 and 20, an armature-actuated switch connected with the feed-main, the contacts 13, 14, 15 and 16, which are made when the armature is attracted, a circuit for the working current extending from the contact 13 to the surface contact and including the coil 18 of the electromagnet, a shunt-circuit from the contact 14 to the surface contact including the coil 20 of the electromagnet, a shunt-circuit from the contact 15 to the surface contact of the station in advance and including the coil 20 of the electromagnet of such advance station, and a shunt-circuit from the contact 16 to the surface contact of the station in the rear, and including the coil 20 of the electromagnet of such rear station, substantially as and for the purposes hereinbefore set forth.

In testimony whereof I have hereunto set my hand this 28th day of December, 1897.

OSCAR PREIL.

Witnesses:
THOS. FEATHERSTONHAUGH,
EWELL A. DICK.